United States Patent [19]

Pire

[11] Patent Number: 5,123,794
[45] Date of Patent: Jun. 23, 1992

[54] CONNECTING MECHANISM WHICH CAN BE RAPIDLY UNLOCKED AND USABLE ON SPACE VEHICLES

[75] Inventor: Michel Pire, Medard-en-Jalles, France

[73] Assignee: Aerospatiale Societe Nationale Industrielle, Paris, France

[21] Appl. No.: 680,328

[22] Filed: Apr. 4, 1991

[30] Foreign Application Priority Data

Apr. 25, 1990 [FR] France .............. 90 05266

[51] Int. Cl.⁵ .............................. F16B 35/02
[52] U.S. Cl. ................... 411/383; 411/396; 411/916
[58] Field of Search .............. 411/345, 383, 384, 433, 411/396, 397, 916, 267, 270; 403/309, 310, 313, 322, 325

[56] References Cited

U.S. PATENT DOCUMENTS

| 2,985,898 | 5/1961 | Goude ............. 411/397 |
| 3,204,515 | 5/1962 | Dickie et al. . |
| 3,386,138 | 6/1968 | Overman ........... 411/383 |
| 3,444,773 | 5/1969 | Ligne .............. 411/396 |
| 4,671,718 | 6/1987 | Eakin .............. 411/345 |
| 4,737,059 | 4/1988 | Batten ............. 411/433 |
| 4,902,046 | 2/1990 | Maloberti ......... 411/433 |
| 4,929,135 | 5/1990 | DeLarue et al. ... 411/267 |

FOREIGN PATENT DOCUMENTS

| 0363242 | 9/1989 | European Pat. Off. . |
| 2616856 | 6/1987 | France . |
| 2616857 | 6/1987 | France . |

Primary Examiner—Neill R. Wilson
Attorney, Agent, or Firm—Hayes, Soloway, Hennessey & Hage

[57] ABSTRACT

In order to interconnect two subassemblies (12, 14), which must be rapidly disengaged, use is made of a mechanism having two rods (36, 44) arranged end to end and which are normally linked in rotation and translation by unlockable connecting means (56, 64). A first (36) of these rods is mounted in a cylinder (14) connected to a first subassembly and has an operating head (38) accessible from the outside of the cylinder. The second rod (44) has a thread (50) screwed onto the second subassembly (12). This arrangement makes it possible to easily fit the mechanism by actuating the operating head (38). A piston (20) mounted in the cylinder (14) controls the unlocking of the connecting means.

10 Claims, 3 Drawing Sheets

CONNECTING MECHANISM WHICH CAN BE RAPIDLY UNLOCKED AND USABLE ON SPACE VEHICLES

FIELD OF THE INVENTION

The invention relates to a mechanism making it possible to interconnect two subassemblies, particularly on a space vehicle and to rapidly unlock or disengage the said subassemblies.

BACKGROUND OF THE INVENTION

Already a certain number of connecting mechanisms with fast unlocking and with or without ejection are known, whereof the motive power is generally supplied by a pyrotechnic system belonging to the mechanism or located outside the latter. Thus, the embodiment of FIGS. 2A and 2B of FR-A-2 616 857 describes a connecting mechanism with fast unlocking and without ejection controlled by a pyrotechnic system belonging to the mechanism.

This mechanism comprises a rod entirely located within a cylinder belonging to a first of the said subassemblies. One of the ends of the said rod has a thread onto which is normally engaged a segmented nut surrounded by a rigid ring connected to an annular piston arranged coaxially around the rod and able to slide within the cylinder. The segmented nut bears on a bush screwed into a part, which bears on the second subassembly. The opposite end of the rod also has a thread onto which is screwed a nut, which bears on an abutment washer mounted within the cylinder. This nut makes it possible to apply the two subassemblies to one another with a given prestress via the rod and the segmented nut, prior to the closing of the cylinder.

In this mechanism, the unlocking or disengaging of the two subassemblies is obtained by means of a pyrotechnic system placed in a chamber formed between the cylinder and the face of the piston turned towards the second subassembly. The released combustion gases bring about the displacement of the piston and the rigid ring which it supports on moving away from the second subassembly and thus releases the segmented nut from the thread formed at the corresponding end of the rod.

The mechanism illustrated in this document, as also in other documents including FR-A-2 616 856, U.S. Pat. No. 3,597,919 and U.S. Pat. No. 3,196,745, is in particular characterized by a particularly complicated and difficult fitting and by a not very precise checking of the tightening or locking tension.

Thus, in FR-A-2 616 857, the connecting mechanism is fixed to the second subassembly by a nut, which it is very difficult to manipulate when there is reduced accessibility between the two parts. Therefore the reliability of the fixture is also reduced. Moreover, the tightening tension is applied by screwing a nut onto the threaded end of the rod opposite to the second part in such a way that said tension can only be controlled by measuring the torque applied to the said nut. Due to the fact that this torque measurement integrates the different frictions, the tension can only be checked with a very limited accuracy of approximately ±30%.

SUMMARY OF THE INVENTION

The present invention relates to a connecting mechanism with fast unlocking, whose original design significantly improves the fitting conditions, particularly in a relatively inaccessible environment and which contributes to increasing the reliability of the fixture. In addition, said original design permits a more precise checking of the locking tension, which can be carried out by an elongation measurement, e.g. using an ultrasonic means which obtains freedom from the friction present and consequently has an accuracy of approximately ±10%.

According to the invention, this result is achieved by means of a connecting mechanism, with fast unlocking, for two subassemblies, having two members which are normally joined in translation by disconnectable connecting means, each of the members then bearing respectively on one of the two subassemblies in such a way as to apply them to one another, as well as control means, whose actuation unlocks the connecting means, thus disengaging the said members, wherein the said members have a first rod mounted in a first of the subassemblies and has an operating head accessible from the outside of said first subassembly, and a second rod having a thread which can be screwed into the second subassembly, said disconnectable connecting means normally joining said first and second rods, also in rotation, in such a way that the thread of the second rod can be screwed into the second subassembly by acting on the operating head of the first rod.

In a preferred embodiment of the invention, the disconnectable connecting means incorporate an annular segmented part having an internal profile complementary of the profiled outer surfaces formed on the adjacent ends of the first rod and the second rod, and a rigid ring normally placed around the segmented annular part and whose internal diameter is substantially equal to the external diameter of the latter.

Each of the profiled outer surfaces can then comprise a toothed portion ensuring a joining of the rods in translation and a prismatic portion ensuring a joining of the rods in rotation.

In order to avoid an accidental disconnection, particularly at the time of fitting, the rigid ring is normally joined to the segmented annular part by a frangible member.

Advantageously, the control means incorporate a piston arranged coaxially around the rigid ring in a cylinder integral with the first subassembly, a control chamber able to receive a pressurized fluid being formed between the cylinder and a face of the piston turned towards the second subassembly, the piston being able to bear against a shoulder of the rigid ring turned towards the second subassembly, in order to make said ring slide on the segmented annular part and thus release the said connection means when said pressurized fluid is injected into the control chamber.

In this case, the segmented annular part preferably has, on the side opposite to the second subassembly, a reduced external diameter extension terminated by an outer shoulder on which bears the rigid ring, the first rod also having a shoulder adjacent to the said extension in such a way that the rigid ring, the segmented annular part and the first rod remain connected to the first subassembly when the connection means are released, only the second rod remaining connected to the second subassembly.

Finally, an untimely displacement of the piston with respect to the cylinder is normally prevented by a second frangible member.

DESCRIPTION OF THE DRAWINGS

A preferred embodiment of the invention is described in greater detail hereinafter relative to the attached drawings, wherein show.

DETAILED DESCRIPTION OF THE INVENTION

Figure 1:
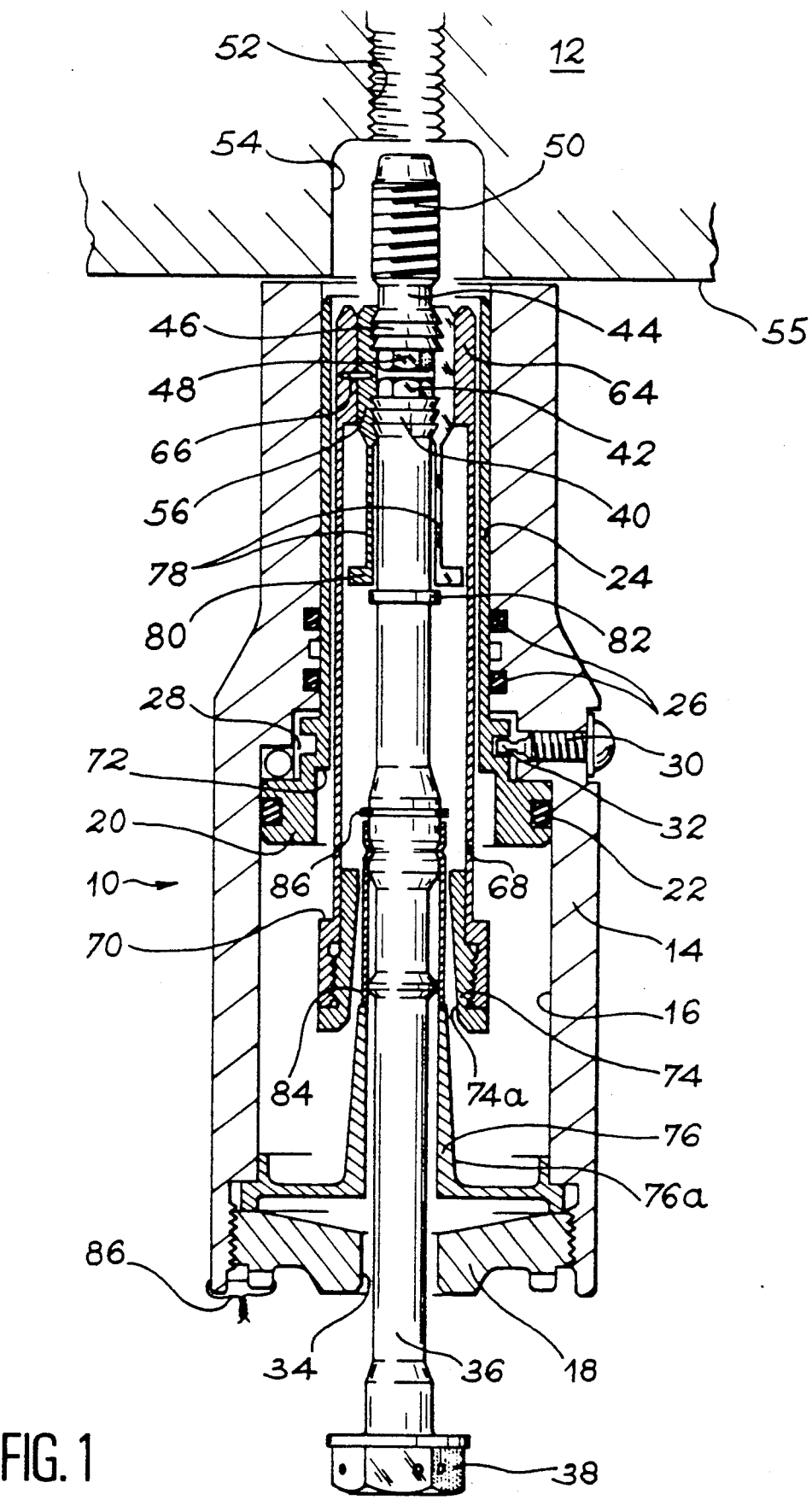
FIG. 1 A longitudinal sectional view showing a connecting mechanism according to the invention and prior to the fitting thereof.

In FIG. 1, reference numeral 10 designates in general terms a connecting mechanism with fast unlocking and without ejection according to the invention. One or more mechanisms of this type and integral with a first, not shown subassembly and which can in particular be the structure of a space vehicle such as a rocket or satellite, make it possible to fit to said first subassembly a second subassembly 12, which has to be rapidly separable from the first and without being ejected.

The connecting mechanism 10 comprises a cylinder 14 internally defining a stepped bore 16 open at each of its ends. This stepped bore 16 has a relatively small diameter portion to be turned towards the subassembly 12 and a relatively large diameter portion terminated by a tapped portion into which is screwed an end cap 18.

An annular piston 20 is received in the relatively large diameter portion of the bore 16. An O-ring 22 received in a groove formed on the periphery of the piston 20 tightly engages the wall of the bore 16. On the side of the subassembly 12, the piston 20 is provided with a tubular extension 24, which is slidingly received in the relatively small diameter portion of the bore 16. The outer surface of said tubular extension 24 is in contact with two O-rings 26 located in grooves formed in the relatively small diameter portion of the bore 16. This arrangement makes it possible to tightly define between the cylinder 14 and the face of the piston 20 turned towards the subassembly 12 a control chamber 28 able to receive a pressurized fluid from external control means not forming part of the mechanism.

These external control means can be of a random type and can in particular be pneumatic, hydraulic or pyrotechnic. The mechanism described preferably uses a detonation-based pyrotechnic energy, use being made of both its mechanical effects of the shock wave type and the thermal effects produced by the combustion of an explosive substance.

A screw 30 radially traverses the cylinder 14 and has a reduced section end 32 constituting a frangible member (i.e. which can break when subject to a shear stress), which penetrates an annular groove formed in that portion of the tubular extension 24 which is contiguous with the piston 20. The screw 30 normally immobilizes the piston 20 in an inoperative position in which said piston bears against the shoulder formed between the relatively small and relatively large diameter portions of the bore 16.

The cap 18 is centrally provided with a hole 34, which is traversed by a cylindrical rod 36 positioned coaxially within the cylinder 14. Outside the mechanism, the rod 36 is provided with an operating head 38, e.g. having a hexagonal shape in the embodiment shown. At its opposite end, the cylindrical rod 36 has a profiled outer surface incorporating a toothed portion 40 and a prismatic portion 42, e.g. which is hexagonal. The toothed portion 40 is formed by annular teeth, whose faces turned towards the subassembly 12 are radially oriented. The length of the rod 36 slightly exceeds the length of the cylinder 14, so that said profiled surface projects beyond the end of the cylinder when the operating head bears on the cap 18.

A second cylindrical rod 44, whose length and weight are greatly reduced compared with those of the rod 36, is placed coaxially in the extension of the latter, on the side of the end having the toothed portion 40 and the prismatic portion 42. The end of the cylindrical rod 44 adjacent to the cylindrical rod 36 also has an outer profiled surface with a toothed portion 46 and a prismatic portion 48, which is e.g. hexagonal. The toothed portion 46 is formed from annular teeth, whose faces opposite to the subassembly 12 are radially oriented. At its opposite end, the cylindrical rod 44 is provided with a thread 50, which can be screwed into a tapped hole 52 formed in the bottom of a recess 54 on a planar face 55 of the subassembly 12 which is to be pressed against the end face of the cylinder 14. It should be noted that the limited length of the rod 44 enables it to be totally retracted within the recess 54, its end adjacent to the rod 36 being set back with respect to the face 55 of the subassembly 12 when the rod 44 is screwed into the latter.

Figure 4:
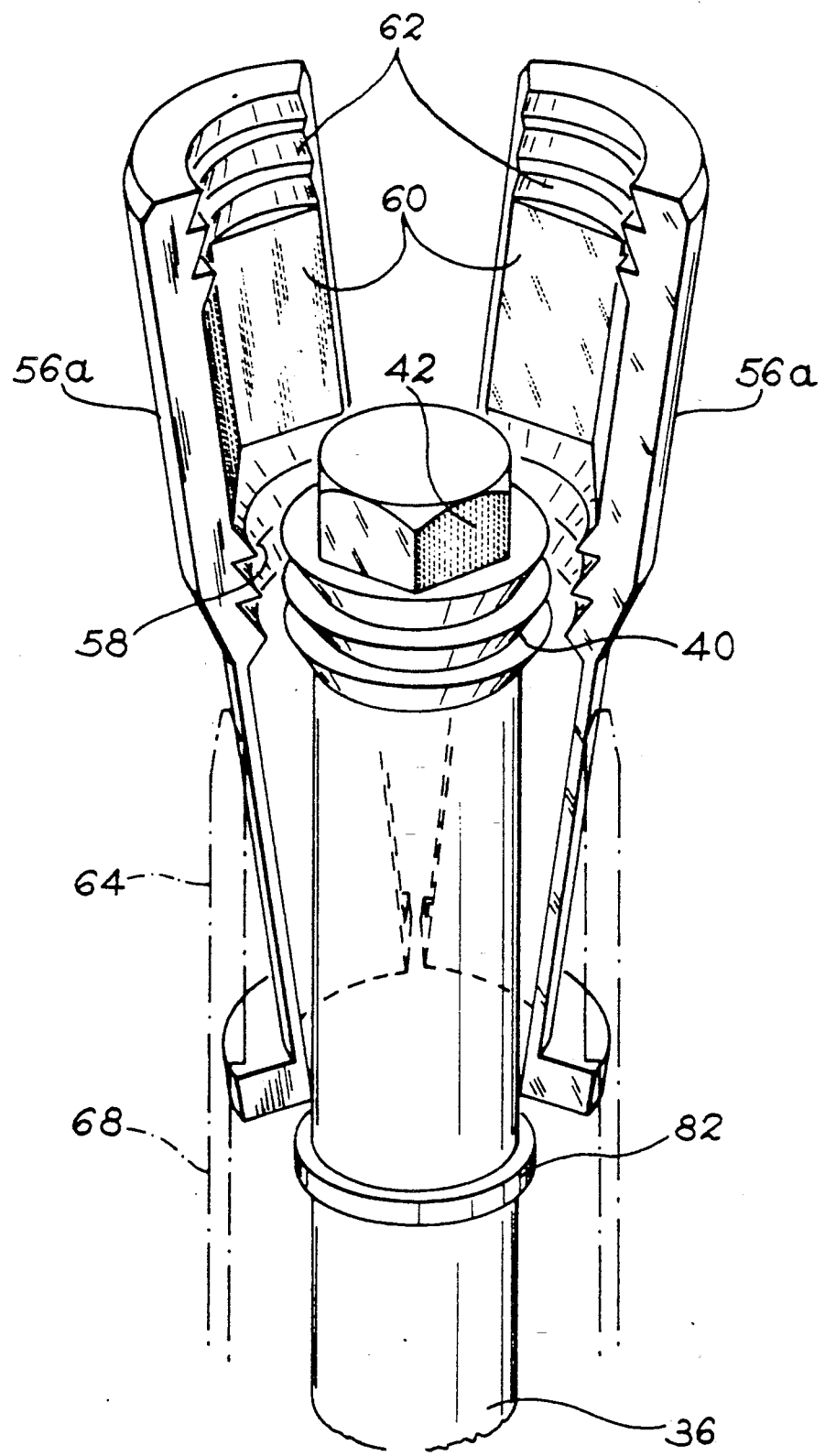
FIG. 4 A perspective view showing on a larger scale part of the unlockable connecting means of the connecting mechanism illustrated by FIGS. 1 to 3.

Around the adjacent ends of the rods 36 and 44 having the profiled outer surfaces is placed a segmented annular part 56, e.g. formed by three segments and whose internal profile is complementary of the profiled outer surfaces formed on each of the rods 36 and 44. Thus, as is best illustrated in FIG. 4, each of the segments 56a of the segmented annular part 56 has on its inner surface a toothed lower portion 58 complementary of the toothed portion 40, a prismatic central portion 60 complementary both of the prismatic portions 42 and 48 and a toothed upper portion 62 complementary of the toothed portion 46.

The segmented annular part 56 has a cylindrical outer surface with which is normally in contact the cylindrical inner surface of a rigid ring 64, which thus ensures the maintaining in engagement of the segmented annular part 56 on the profiled outer surfaces formed on the adjacent ends of the rods 36 and 44.

The assembly described hereinbefore constitutes disconnectable connecting means by which the rods 36 and 44 are normally joined both in rotation and in translation. More specifically, the toothed portions 40, 46, 58 and 62 make it possible to join the two rods in translation, whereas the prismatic portions 42, 48 and 60 make it possible to join the two rods in rotation. Thus, it is possible by acting with the aid of an appropriate spanner on the operating head 38, which is always accessible from the outside of the mechanism, to screw the end of the rod 44 having the thread 50 into the tapped hole 52 formed in the subassembly 12 until the operating head 38 bears on the cap 18. The desired tightening or locking stress can then be applied between the cylinder 14 and the subassembly 12. Moreover, said stress can be accurately controlled by measuring the elongation of the rod 36, e.g. with the aid of ultrasonic measuring means. Thus, such ultrasonic measuring means constitute an external means, not carried on the craft or vehicle, which make it possible to directly measure the tension applied without it being necessary to make hypotheses regarding the friction between the parts.

Moreover and as is shown in FIG. 1, the assembly constituted by the two rods 36 and 44 and by the disconnectable connecting means 56, 64 is placed within the piston 20 and its extension 24 with a certain radial clearance in such a way that it does not interfere with the latter. Therefore this assembly makes it possible to engage and disengage the subassembly 12 of the cylinder 14 in a simple, reliable and repetitive manner without interfering with the piston 20.

In order to avoid an accidental sliding of the rigid ring 64 on the segmented annular part 56, at least one of the segments 56a is advantageously connected to the ring 64 by a frangible pin 66.

On the side of the subassembly 10, the rigid ring 64 has a tubular extension 68, which extends coaxially around the rod 36 and within the piston 20 and its extension 24, up to the interior of the relatively large diameter portion of the bore 16. The internal diameter of the extension 68 exceeds the external diameter of the segmented annular part 56. On its outer surface and in the vicinity of its end, the tubular extension 68 has a shoulder 70 turned towards the subassembly 12 and in such a way that, when fitting is ended (FIG. 2), it is in the immediate vicinity of a shoulder 72 formed within the piston 20. During a displacement of the latter whilst moving away from the part 12, this arrangement makes it possible to move the rigid ring 64 in the opposite direction after breaking the frangible pin 66, so as to release the segmented annular part 56.

The end of the tubular extension 68 also carries a screwed inner ring 74 internally having a truncated cone-shaped surface 74a of limited conicity, whose larger diameter end is turned towards the cap 18. This truncated cone-shaped surface, at the end of the displacement of the rigid ring 64 towards the cap 18, covers a complementary truncated cone-shaped surface formed on the outer surface of a damping part 76. The latter is made from a deformable material and is fixed by jamming between the cover or cap 18 and the cylinder 14.

At its end opposite to the subassembly 12, the segmented annular part 56 also has a tubular extension 78, whose external diameter is significantly less than the internal diameter of the rigid ring 64. At its end, said tubular extension 78 has an external collar 80 forming a shoulder against which can bear the rigid ring 64, following the breaking of the frangible pin 66, when the ring is moved by the piston 20.

The rod 36 also has a collar 82, which is normally positioned in the immediate vicinity of the end of the tubular extension 78 of the segmented annular part 56. This arrangement enables the piston 20 to move the rod 36, in the second phase of its displacement, via the rigid ring 64 and the segmented annular part 56. The end of the rod 36, which normally projects into the recess 54 formed in the subassembly 12, is then entirely retracted into the interior of the cylinder 14.

Finally, the cylindrical rod 36 advatageously supports in its central portion a tube 84, whose end turned towards the subassembly 12 is located in the immediate vicinity of a circlip 86 fitted into a groove of the rod 36.

The tube 84 is also seated in a relatively shallow annular groove adjacent to the circlip 86.

During fiting and as is illustrated in FIG. 1, the end of the tube 84 opposite to the circlip 86 bears on the end of the damping part 76 turned towards the subassembly 12 and enables the end of the cylindrical rod 44 carrying the thread 50 to project beyond the end of the cylinder 14.

The particularly easy fitting of the mechanism 10 according to the invention, as well as its unlocking will now be briefly described with reference to FIGS. 1 to 3.

During the preparation of the connecting mechanism, the piston 20 is firstly put into place and immobilized in the cylinder 14 by the screw 30. All the other parts of the mechanism in particular involving the rods 36 and 44, the annular segmented part 56, the rigid ring 64, the cap 18, the damping part 76 and the tube 84 are assembled separately. The thus constituted assembly is put into place in the cylinder 14 and fixed with the aid of the cap 18, the latter then being immobilized e.g. by means of a metal wire illustrated at 86 in FIG. 1. The aforementioned assembly can be fitted and dismantled very easily, without interfering with the piston 20 and without acting on the screw 30, whose locking it ensures.

The subassembly 12 to be fixed to the not shown subassembly carrying the mechanism 10 is then brought into the position illustrated in FIG. 1, so that the end of the cylindrical rod 44 carrying the thread 50 can be located within the recess 54.

By acting on the operating head 38 with the aid of a spanner and in the manner mentioned hereinbefore, the operator can very easily screw the end of the rod 44 carrying the thread 50 into the tapped hole 52 of the subassembly 12. When the operating head 38 bears on the cap 18, the tightening is continued until a given positioning stress of the face 55 of the subassembly 12 is obtained against the adjacent end face of the cylinder 14. This stress can be accurately checked by carrying out a measurement of the elongation of the rod 36 with the aid of an external ultrasonic measuring system not carried on the vehicle.

Figure 2:
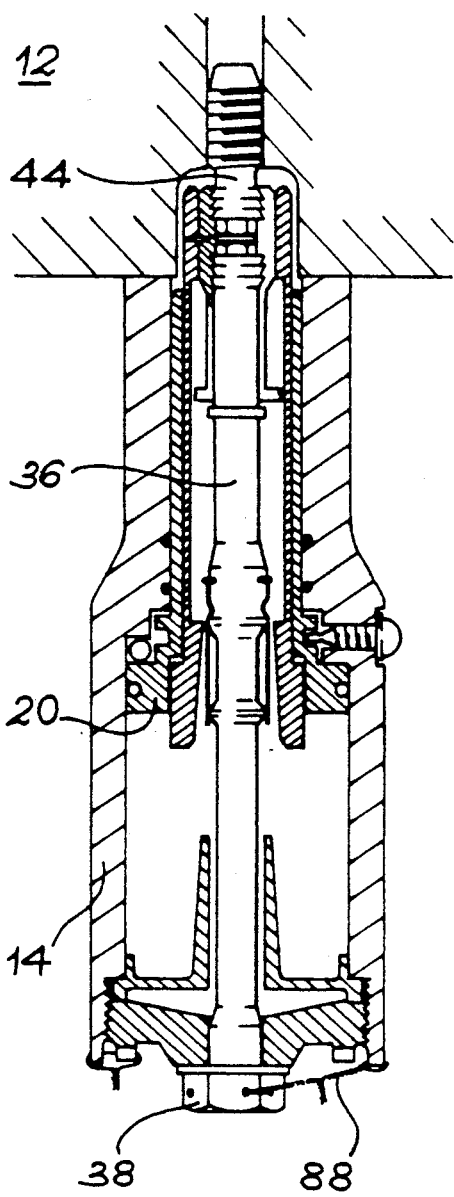
FIG. 2 A diagrammatic sectional view comparable to FIG. 1 showing the fitted connected mechanism ensuring the assembly of the two subassemblies.

When tightening or locking is ended, the position is that illustrated in FIG. 2 and an accidental unlocking is prevented, e.g. by passing a metal wire 88 between the operating head 38 and the cylinder 14.

When it is wished to separate the subassembly 12 from the main subassembly to which is fixed the cylinder 14, actuation takes place of the external control means which communicate with the control chamber 28. Pressurized fluid is then admitted into the said chamber and has the effect of moving the piston 20 away from the subassembly 12. In its movement, the piston displaces the rigid ring 64 after breaking the frangible pin 66. The rigid ring 64 then faces the reduced external diameter tubular extension 78 of the segmented annular part 56. Consequently the segments 56a constituting the latter are no longer maintained in place andradially move apart, thus disconnecting the rods 36 and 44. The subassembly 12 is then disengaged from the main subassembly carrying the cylinder 14.

Figure 3:
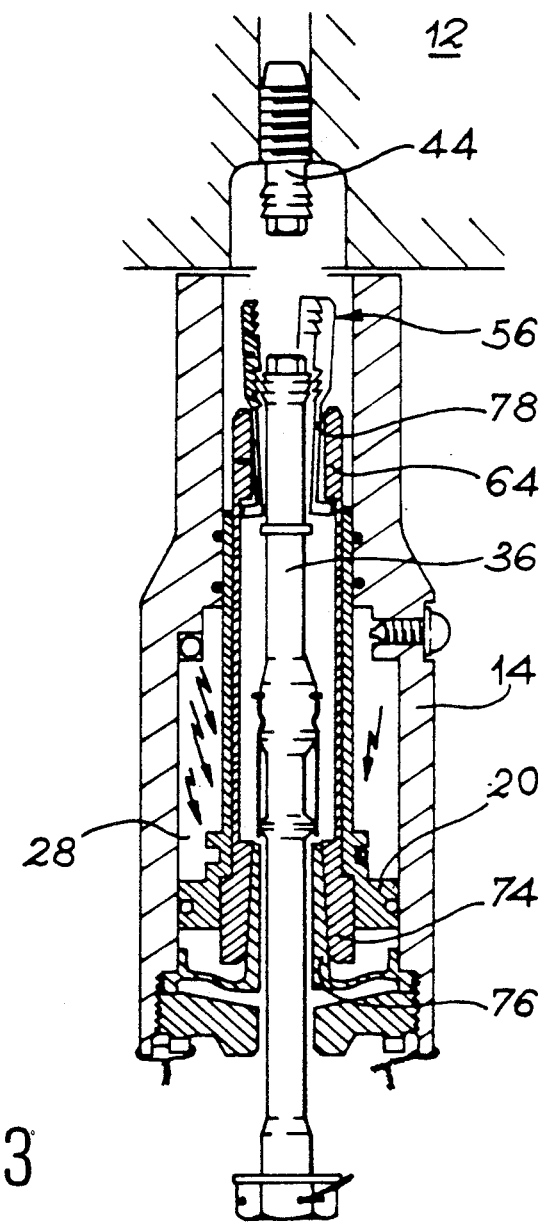
FIG. 3 A diagrammatic sectional view comparable to FIG. 2 showing the connecting mechanism immediately after its unlocking.

As illustrated in FIG. 3, the piston 20 then carries in its displacement the segments 56a of the segmented annular part 56, as well as the cylindrical rod 36, in such a way that only the cylindrical rod 44 remains connected to the subassembly 12 and the assembly of the other parts is located within the cylinder 14. Therefore separation of the two subassemblies can take place without any risk of one of the parts of the mechanism accidentally remaining attached to the subassembly 12.

At the end of the displacement of the piston 20, the rigid ring 64, the segmented annular part 56 and the cylindrical rod 36, the truncated cone-shaped surface 74a formed within the screwed ring 74 bears against the complementary truncated cone-shaped surface formed on the damping part 76. The latter is then deformed in the manner illustrated in FIG. 3 and absorbs the residual energy.

Obviously the invention is not limited to the embodiment described in exemplified manner hereinbefore and covers all variants thereof. Thus, the profiled outer surfaces formed on each of the ends of the rods 36 and 44 can have shapes different from those described, provided that they ensure the joining of the rods in rotation and translation when they are covered by the deformable annular part 56. This can in particular be obtained by producing complementary prismatic surfaces at the adjacent ends of the two rods, said surfaces being fitted into one another in order to join the rods in rotation when the latter are joined in translation by a segmented annular part, which then only ensures the joining in translation of the two rods.

Moreover, the screwed connection between the cylindrical rod 44 and the subassembly 12 can be differently obtained and the subassembly can have a threaded rod which is screwed into a tapped hole formed at the adjacent end of the rod 44.

In addition, as stated hereinbefore, the control means external of the mechanism can be of a random nature, provided that they can supply a pressurized fluid to the control chamber 28.

Finally, although the mechanism described hereinbefore has no ejector and releases the subassembly 12 without an initial velocity, it is clear than an ejector could be associated therewith without passing beyond the scope of the invention.

I claim:

1. A quick release mechanism for connecting two subassemblies, and capable of quickly releasing said subassemblies even when they are in tension, and comprising:
   first and second rod members arranged end to end and normally joined in rotation and translation by a disconnectable connecting means;
   said first rod rotatably mounted in a cylinder connected to said first subassembly, and having an operating head accessible from the outside of said cylinder; said second rod having a thread for engaging with a complementary thread on said second subassembly, and disconnectable connecting means normally joining said rods in rotation and translation such that the thread of said second rod may be screwed into the second subassembly by rotating the operating head of said first rod.

2. A mechanism according to claim 1, wherein said second rod is entirely retracted into a recess formed in the face of said second subassembly adjacent said first subassembly, when said second rod is screwed into said second subassembly.

3. A mechanism according to claim 1, wherein adjacent ends of said first and second rods have matching profiled outer surfaces, and wherein said disconnectable connecting means comprises an annular segmented part having an internal profile complementary of said first and second rods profiled outer surfaces, and including a rigid ring surrounding said segmented annular part whose internal diameter is substantially equal to the external diameter of said profiled outer surfaces.

4. A mechanism according to claim 3, wherein each of said profiled outer surfaces comprises a toothed portion for joining said rods in translation and a prismatic portion for joining said rods in rotation.

5. A mechanism according to claim 3, wherein said rigid ring is normally joined to said segmented annular part by a frangible member.

6. A mechanism according to claim 3, wherein said control means comprises a piston arranged coaxially around said rigid ring in a cylinder integral with said first subassembly, and including a control chamber for receiving a pressurized fluid formed between said cylinder and a face of said piston turned towards said second subassembly, said piston being arranged to bear against a shoulder of said rigid ring turned towards said second subassembly, in order to make said ring slide on said segmented annular part and thus release said connection means when said pressurized fluid is injected into the control chamber.

7. A mechanism according to claim 6, wherein said segmented annular part has, on the side opposite to said second subassembly, a reduced external diameter extension terminated by an external shoulder on which may bear said rigid ring, said first rod also having a shoulder adjacent said extension such that said rigid ring, said segemented annular part and said first rod remain connected to said first subassembly when said connecting means are released, only said second rod remaining connected to the second subassembly.

8. A mechanism according to claim 7, wherein the end of said cylinder opposite said second subassembly also includes a damping part against which may bear an extension of said rigid ring when the latter is displaced by said piston following the injection of said pressurized fluid into said control chamber, said rigid ring, said annular segmented part and said first rod then being totally retracted within said cylinder.

9. A mechanism according to claim 6, wherein said first and second rods, said segmented annular part and said rigid ring constitute an assembly able to engage and disengage said second subassembly with respect to said first tsubassembly without interfering with said piston.

10. A mechanism according to claim 6, wherein said piston is normally joined to said cylinder by a second frangible member.

* * * * *

UNITED STATES PATENT AND TRADEMARK OFFICE
CERTIFICATE OF CORRECTION

PATENT NO. : 5,123,794

DATED : June 23, 1992

INVENTOR(S) : Michel Pire

It is certified that error appears in the above-identified patent and that said Letters Patent is hereby corrected as shown below:

"Claim 9, col. 8, line 54, "tsubassembly" should be --subassembly--."

Signed and Sealed this

Thirty-first Day of August, 1993

Attest:

BRUCE LEHMAN

Attesting Officer     Commissioner of Patents and Trademarks